United States Patent
Farah et al.

(10) Patent No.: US 9,803,557 B2
(45) Date of Patent: Oct. 31, 2017

(54) GAS TURBINE ENGINE AND BLOCKER DOOR ASSEMBLY

(71) Applicant: United Technologies Corporation, Hartford, CT (US)

(72) Inventors: Jorge I. Farah, Hartford, CT (US); Donald W. Peters, Colchester, CT (US); Adam Covino, Manchester, CT (US); Curtis C. Cowan, E. Hampton, CT (US); James R. Harders, Andover, CT (US); Nicholas W. Kantany, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 225 days.

(21) Appl. No.: 14/600,951

(22) Filed: Jan. 20, 2015

(65) Prior Publication Data
US 2016/0208714 A1    Jul. 21, 2016

(51) Int. Cl.
| | |
|---|---|
| *F01D 17/14* | (2006.01) |
| *F02K 3/075* | (2006.01) |
| *F02C 7/18* | (2006.01) |
| *F02C 9/18* | (2006.01) |
| *F01D 17/10* | (2006.01) |

(Continued)

(52) U.S. Cl.
CPC .............. *F02C 9/18* (2013.01); *F01D 17/105* (2013.01); *F01D 17/141* (2013.01); *F01D 17/143* (2013.01); *F02C 7/14* (2013.01); *F02K 3/075* (2013.01); *F02K 3/077* (2013.01); *F02K 3/10* (2013.01); *F05D 2250/411* (2013.01);

(Continued)

(58) Field of Classification Search
CPC ........ F02C 7/16–7/185; F01D 17/143–17/146; F01D 17/141; F01D 17/105; F02K 3/075–3/077; F05D 2250/411
See application file for complete search history.

(56) References Cited

U.S. PATENT DOCUMENTS

| | | | | |
|---|---|---|---|---|
| 1,557,197 | A | * 10/1925 | Dickey | F01P 7/026 |
| | | | | 123/41.04 |
| 2,666,618 | A | *  1/1954 | Jaquith | F01D 17/141 |
| | | | | 251/283 |

(Continued)

FOREIGN PATENT DOCUMENTS

| | | | |
|---|---|---|---|
| DE | WO 2011020664 A2 * | 2/2011 | ........... F01D 17/145 |
| JP | S56165704 A | 12/1981 | |

OTHER PUBLICATIONS

EP search report for EP15195716.4 dated Jun. 10, 2016.

*Primary Examiner* — Pascal M Bui Pho
*Assistant Examiner* — Rene Ford
(74) *Attorney, Agent, or Firm* — O'Shea Getz P.C.

(57) ABSTRACT

A blocker door assembly which may be for a cooling system that may be applied to a gas turbine engine includes a plurality of blocker doors circumferentially spaced about an engine axis. Each blocker door is constructed and arranged to move in a circumferential direction to, at least in-part, control air flow through a passage in an adjacent fixture. A sync-ring is concentrically located about the engine axis, disposed in an annular first duct in direct communication with each passage, and engaged to each one of the plurality of blocker doors for simultaneous operation. The sync-ring is aero-dynamically shaped to reduce surrounding airflow resistance.

9 Claims, 4 Drawing Sheets

(51) Int. Cl.
  *F02K 3/077* (2006.01)
  *F02K 3/10* (2006.01)
  *F02C 7/14* (2006.01)

(52) U.S. Cl.
  CPC .... *F05D 2260/213* (2013.01); *F05D 2260/50* (2013.01); *Y02T 50/675* (2013.01)

(56) References Cited

U.S. PATENT DOCUMENTS

| | | | |
|---|---|---|---|
| 3,153,904 A | 10/1964 | Ellis et al. | |
| 4,006,589 A * | 2/1977 | Schirmer | F23C 6/045 60/39.23 |
| 4,187,675 A | 2/1980 | Wakeman | |
| 4,708,588 A * | 11/1987 | Schwarz | F01D 5/081 415/115 |
| 5,136,840 A * | 8/1992 | Nash | F02C 9/18 60/226.3 |
| 5,157,917 A * | 10/1992 | Liang | F02K 1/825 60/226.1 |
| 5,347,807 A * | 9/1994 | Brossier | F02K 3/075 137/15.1 |
| 5,799,927 A * | 9/1998 | Geist | F01D 17/167 251/212 |
| 5,806,303 A | 9/1998 | Johnson | |
| 5,809,772 A | 9/1998 | Giffin et al. | |
| 6,402,465 B1 * | 6/2002 | Maier | F01D 17/148 137/625.15 |
| 7,246,484 B2 | 7/2007 | Giffin et al. | |
| 7,395,657 B2 | 7/2008 | Johnson | |
| 7,922,445 B1 | 4/2011 | Pankey et al. | |
| 8,833,053 B2 | 9/2014 | Chir et al. | |
| 2003/0167750 A1 * | 9/2003 | Bornhoft | F02C 3/13 60/226.1 |
| 2005/0129501 A1 | 6/2005 | Coull et al. | |
| 2007/0245739 A1 * | 10/2007 | Stretton | F01D 17/105 60/728 |
| 2010/0170220 A1 * | 7/2010 | Kohlenberg | F01D 17/105 60/226.3 |
| 2010/0189550 A1 | 7/2010 | Geist | |
| 2012/0131902 A1 | 5/2012 | Baughman et al. | |
| 2013/0001892 A1 | 1/2013 | Smith et al. | |
| 2013/0089408 A1 * | 4/2013 | Joe | F01D 11/24 415/116 |
| 2014/0263737 A1 | 9/2014 | Pierluissi et al. | |
| 2014/0271116 A1 | 9/2014 | Snyder et al. | |
| 2016/0097327 A1 * | 4/2016 | Kantany | F02K 3/075 415/146 |

* cited by examiner

GAS TURBINE ENGINE AND BLOCKER DOOR ASSEMBLY

STATEMENT REGARDING FEDERALLY SPONSORED RESEARCH OR DEVELOPMENT

This disclosure was made with Government support under FA8650-09-D-2923-0021 awarded by The United States Air Force. The Government has certain rights in this disclosure.

BACKGROUND

The present disclosure relates to a gas turbine engine and, more particularly, to a blocker door assembly within the gas turbine engine.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust. Downstream of the turbine section, may be an augmentor section, or "afterburner," that is operable to selectively increase the thrust. The increase in thrust is produced when fuel is injected into the core exhaust gases downstream of the turbine section and burned to generate a second combustion.

Blocker door assemblies such as those employed by cooling systems are applied in gas turbine engines for the control of airflow from one airstream to the next. The efficient control of air flow within applications such as gas turbine engines remains an area of interest. Many known blocker door assemblies have various disadvantages, shortcomings, and drawbacks relative to certain applications. Accordingly, there remains a need for further development in this area of technology.

SUMMARY

A blocker door assembly for a gas turbine engine according to one, non-limiting, embodiment of the present disclosure includes a plurality of blocker doors circumferentially spaced about an engine axis, wherein each blocker door is constructed and arranged to move in a circumferential direction to control air flow through a passage in an adjacent fixture; and an aerodynamically shaped sync-ring concentrically located about the engine axis, disposed in an annular first duct in direct communication with the passage, and engaged to each one of the plurality of blocker doors for simultaneous operation.

Additionally to the foregoing embodiment, the aerodynamically shaped sync-ring is located downstream from the plurality of blocker doors.

In the alternative or additionally thereto, in the foregoing embodiment, the sync-ring has an aerodynamic cross-sectional profile for minimizing air flow resistance in the first duct.

In the alternative or additionally thereto, in the foregoing embodiment, the assembly includes a plurality of stanchions in the first annular duct, wherein each stanchion of the plurality of stanchions extends axially between and is engaged to a respective one of the plurality of blocker doors and the sync-ring.

In the alternative or additionally thereto, in the foregoing embodiment, the cross sectional profile has a first convex side facing substantially radially outward and a second convex side facing substantially radially inward.

In the alternative or additionally thereto, in the foregoing embodiment, the first and second convex sides each span axially and form together at circumferentially continuous leading and trailing edges.

In the alternative or additionally thereto, in the foregoing embodiment, the leading edge is generally bull-nosed and the trailing edge is generally pointed.

In the alternative or additionally thereto, in the foregoing embodiment, the assembly includes a plurality of stanchions in the first duct, wherein each stanchion of the plurality of stanchions extends axially between and is engaged to a respective one of the plurality of blocker doors and the leading edge.

In the alternative or additionally thereto, in the foregoing embodiment, the sync-ring spans substantially axially between circumferentially continuous leading and trailing edges, and wherein the leading and trailing edges are radially displaced from one-another for mixing of air flow.

In the alternative or additionally thereto, in the foregoing embodiment, the fixture is a heat exchanger operative to flow a cooling airstream received from an annular second duct and expelled into the first duct.

A gas turbine engine according to another, non-limiting, embodiment includes a fan section; a compressor section in fluid communication with the fan section; a combustor section in fluid communication with the compressor section and constructed and arranged to receive a core airstream from the compressor section; a turbine section in fluid communication with the combustor section for receiving and extracting energy from the core airstream, and drivingly coupled to the compressor and fan sections; a bypass duct in fluid communication with the fan section for flowing a bypass airstream; a second duct for flowing a third airstream; and a cooling system in fluid communication between the bypass duct and the second duct for flowing at least a portion of the bypass airstream from the bypass duct and into the second duct, the cooling system including a plurality of blocker doors circumferentially spaced about an engine axis constructed and arranged to control flow of a portion of the bypass airstream from the bypass duct and into the second duct and an aerodynamically shaped sync-ring concentrically located about the engine axis and engaged to the plurality of blocker doors for simultaneous operation.

Additionally to the foregoing embodiment, the cooling system includes a plurality of heat exchangers with each one of the plurality of heat exchangers associated with a respective one of the plurality of blocker doors.

In the alternative or additionally thereto, in the foregoing embodiment, the bypass duct and the second duct are annular in cross section with the second duct disposed radially outward from the bypass duct.

In the alternative or additionally thereto, in the foregoing embodiment, the fan section has a leading fan and a trailing fan with the leading fan in fluid communication with the trailing fan and the second duct, and the trailing fan in fluid communication with the compressor section and the bypass duct.

In the alternative or additionally thereto, in the foregoing embodiment, the cooling system includes a plurality of heat exchangers with each one of the plurality of heat exchangers associated with a respective one of the plurality of blocker doors, and each heat exchanger being constructed and arranged to cool a flowing medium received from a component using the portion of the bypass stream.

In the alternative or additionally thereto, in the foregoing embodiment, the sync-ring is in the second duct and is axially spaced downstream from the plurality of blocker doors.

In the alternative or additionally thereto, in the foregoing embodiment, the sync-ring has an aerodynamic cross-sectional profile for minimizing flow resistance in the third airstream.

In the alternative or additionally thereto, in the foregoing embodiment, the cooling system includes a plurality of stanchions with each one of the plurality of stanchions extending axially between and engaged to a respective one of the plurality of blocker doors and the sync-ring.

In the alternative or additionally thereto, in the foregoing embodiment, the cross sectional profile has an arcuate first side facing substantially radially outward and an opposite arcuate second side facing substantially radially inward, and wherein the first and second sides each span axially and form together at circumferentially continuous leading and trailing edges.

A method of operating a cooling system according to another, non-limiting, embodiment, includes the steps of controllably flowing a portion of a first airstream through a plurality of heat exchanges spaced circumferentially about an axis; discharging the portion into an annular second airstream; and controlling the flow of the portion via a plurality of blocker doors each engaged to a common aero-dynamically shaped sync-ring for simultaneous actuation, wherein the sync-ring is located in the second stream and axially spaced downstream from the plurality of blocker doors, and has an arcuate first side facing substantially radially outward and an arcuate second side facing substantially radially inward to reduce pressure losses in the second airstream.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
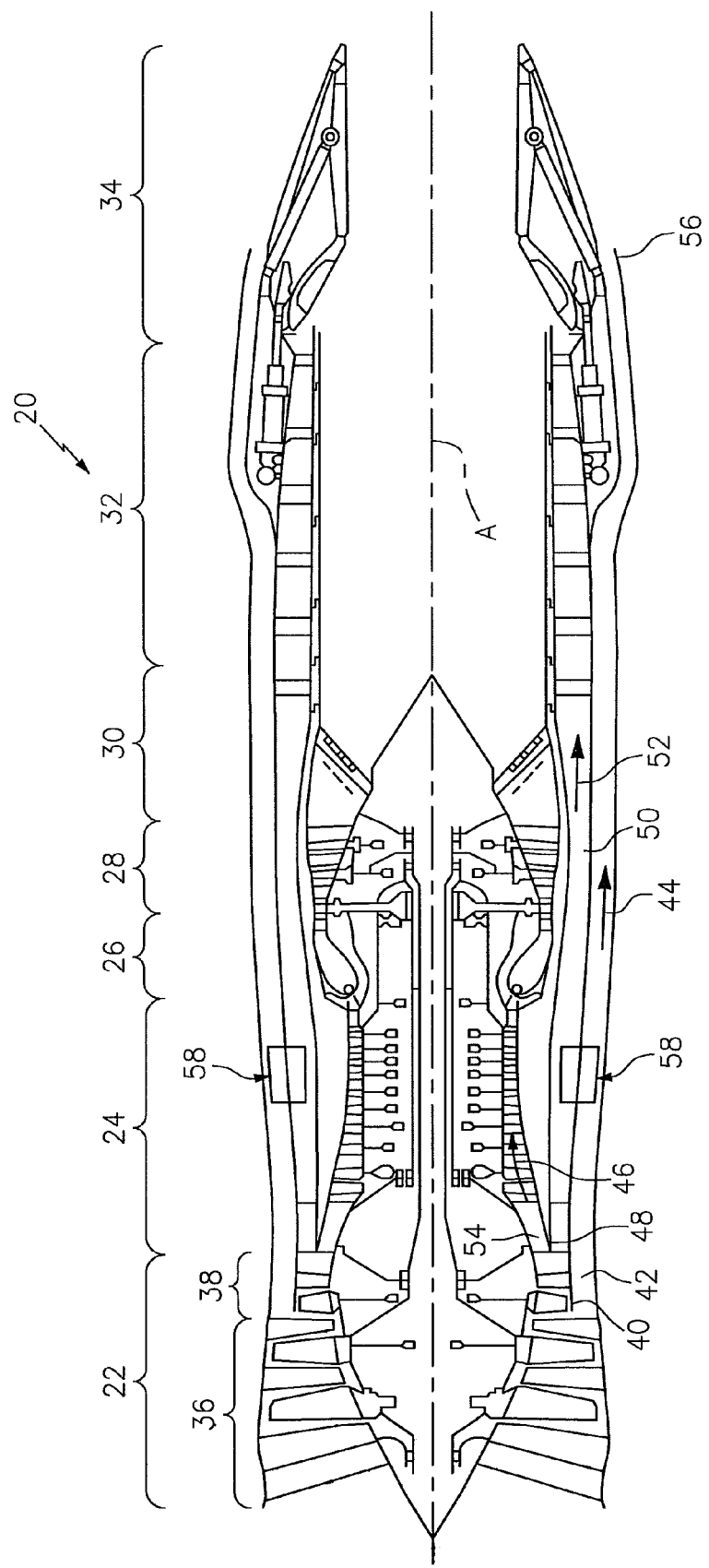
FIG. 1 is a schematic cross section of a gas turbine engine.

Referring to FIG. 1, a gas turbine engine 20 is disclosed as a two-spool low-bypass augmented turbofan that generally incorporates a fan section 22, a compressor section 24, a combustor section 26, a turbine section 28, an augmenter section 30, an exhaust duct 32, and a nozzle system 34 along a central engine axis A. Although depicted as an augmented low bypass turbofan in the disclosed, non-limiting, embodiment, it is understood that the concepts of the present disclosure are applicable to other gas turbine engines including non-augmented engines, geared architecture engines, land-based turbine engines, direct-drive turbofans, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

The exhaust duct section 32 may be circular in cross section as typical of an axisymmetric augmented low bypass turbofan, or may be non-axisymmetric in cross section to include, but not limited to, a serpentine shape to block direct view to the turbine section 28. In addition to the various cross sections and the various longitudinal shapes, the exhaust duct section 32 terminates with the nozzle system 34 such as a Convergent/Divergent (C/D) nozzle system, an non-axisymmetric two-dimensional (2D) C/D vectorable nozzle system, a flattened slot nozzle of high aspect ratio or other nozzle arrangement.

As illustrated, the fan section 22 is a multi-staged fan section that may generally function as a low pressure compressor and the compressor section 24 generally functions as a high pressure compressor. In alternative designs such as a high bypass ratio engine (not shown), the fan section may be single staged followed by a compressor section that has both low and high pressure stages. In the present illustration, the fan section 22 has a leading fan 36 and an adjacent, downstream, trailing fan 38. During engine 20 operation, airflow produced by the leading fan 36 is pressurized and directed at least in-part through the trailing fan 38. A flow control device 40 generally position axially between the leading and trailing fans 36, 38 may re-direct a portion of the airflow discharged from the leading fan 36 into an outer bypass duct 42 as an outer bypass airstream (see arrow 44). The balance of the airflow discharged from the leading fan 36 enters the trailing fan 38, is further pressurized, and is discharged via a duct 54, at least in-part, into the compressor section 24 as a core airstream (see arrow 46). A flow control device 48 generally positioned axially between the trailing fan 38 and the compressor section 24 may re-direct a portion of the airflow discharged from the trailing fan 38 into an inner bypass duct 50 as an inner bypass airstream (see arrow 52).

As non-limiting examples, the flow control devices 40, 48 may generally be passive and/or fixed with downstream flow of the respective airstreams 44, 46 dictated by placement of the devices 40, 48, respective pressures, and/or temperatures. Other example flow control devices 40, 48 may include various valve arrangements (not illustrated) to divide the flow between engine regions as illustrates, or in other duct systems not shown.

The engine has a case structure that generally functions as an exoskeleton to support rotational hardware of the engine 20 and includes, a core airflow pathway or duct 54 for flowing the core airstream 46. The inner bypass duct 50 is generally annular in shape, and is located radially adjacent to and outward from the core duct 54. The outer bypass duct 42 may be annular in shape, and is located radially adjacent to and outward from the inner bypass duct 50.

The core airstream 46 enters the compressor section 24 at a relatively low pressure produced by the multi-staged fan section 22 and exits at a higher pressure. The high pressure core airstream 46 then passes through the combustor section 26, the turbine section 28, then the augmentor section 30, where fuel may be selectively injected and burned to generate additional thrust, and then through the nozzle system 34. The inner bypass airstream 52 may be generally sourced from the trailing fan 38 and may be utilized for a variety of purposes including, for example, cooling and pressurization, and ultimately, at least partially, injected into the core airflow path 38 adjacent to the exhaust duct section 32 and the nozzle system 34 to provide a component of thrust. The outer bypass airstream 44 may be generally sourced from the leading fan 36 at a lower pressure and discharged through a dedicated discharge nozzle 56 located radially outward from, and generally axially aligned to, the exhaust duct section 32 or the nozzle system 34. Alternatively the outer bypass airstream may be discharged into the exhaust duct section 32 to provide a component of thrust. It is further contemplated and understood that the outer bypass duct 42 may not be annular in shape and may not receive the airstream 44 directly from the leading fan 36. Instead, the bypass duct 42 may be any auxiliary duct that may, for example, receive airflow directly from the inner bypass duct 50.

Figure 2:
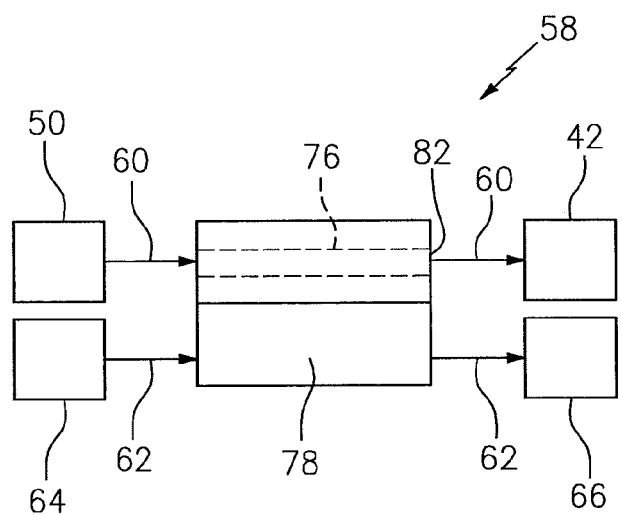
FIG. 2 is a schematic of a cooling system of the engine.

Referring to FIGS. 1 and 2, a cooling system 58 may generally use a portion 60 of the inner bypass airstream 52 from inner bypass duct 50 to cool a flow medium 62 discharged from a component 64 that may be an engine component. Once cooled, the flow medium 62 is discharged from the cooling system 58 and flows back to a component 66. After cooling of the flow medium 62, the now heated portion 60 of the airstream 52 is discharged from the cooling system 58 into the outer bypass duct 42 where the heated portion 60 joins and mixes with the outer bypass airstream 44. It is understood and contemplated that components 64, 66 may be the same component wherein the cooling system 58 facilitates cooling of the component. It is further contemplated that one or both components may not be engine components and may be located elsewhere in the aircraft. Moreover, one or both of the ducts 42, 50 may not be bypass ducts with the duct receiving the discharged portion 60 being annular in shape.

Figure 3:
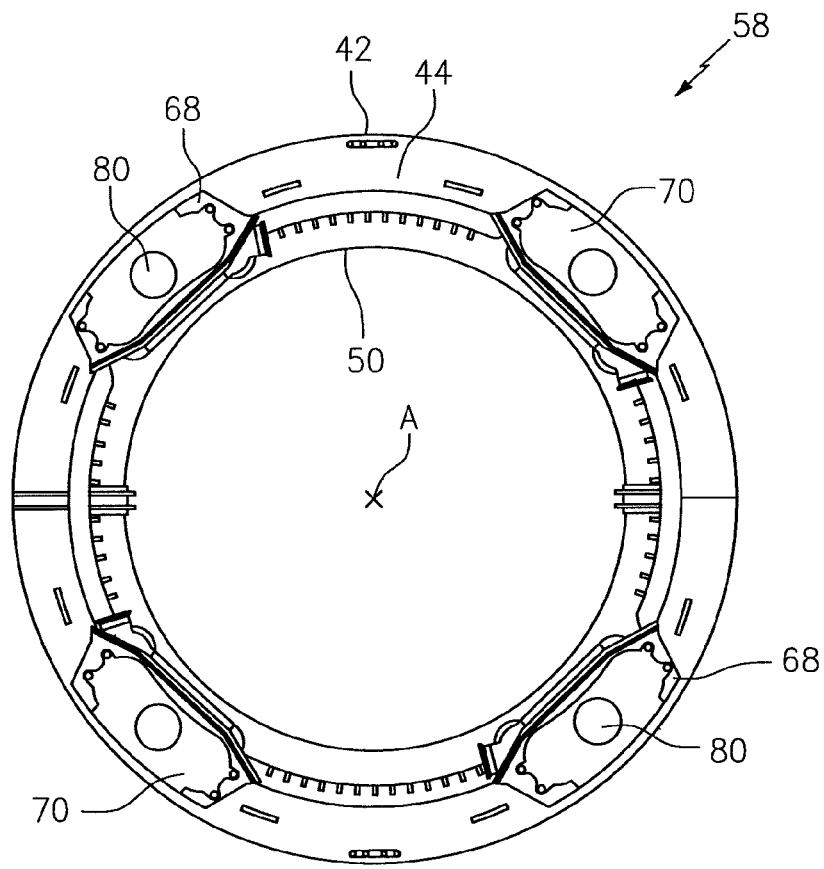
FIG. 3 is an axial plan view of the cooling system with components removed to show detail.
Figure 4:
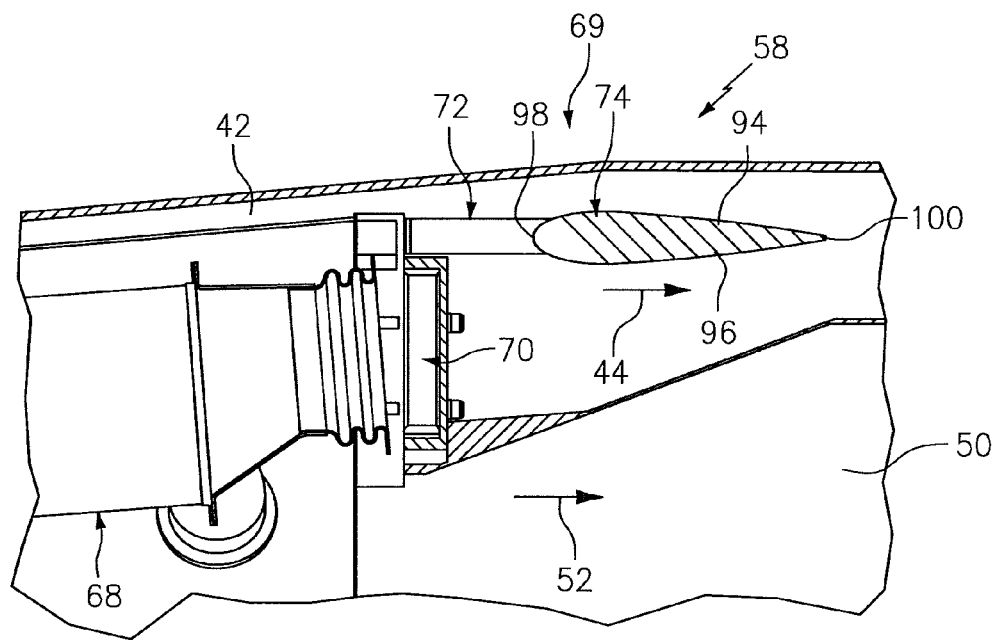
FIG. 4 is a partial side view of the cooling system.

Referring to FIGS. 2 through 4, the cooling system 58 may include a plurality of heat exchangers 68 (four illustrated in FIG. 3) circumferentially spaced about the engine axis A, and a blocker door assembly 69 having a plurality of blocker doors 70, a plurality of stanchions 72, and an aerodynamically shaped sync-ring 74. Each heat exchanger 68 may have a cold side or passage 76 for flowing the portion 60 and a hot side 78 for flowing the medium 62. It is contemplated and understood that the heat exchanger 68 may be any of a variety of types such as, for example: parallel flow, counter flow, cross flow, and/or mixed flow types. The flowing medium 62 may be in a liquid or gas form. Examples of mediums may include oil, hydraulic fluid, air and refrigerant. It is further understood that the heat exchanger 68 may be any type of fixture with a flow passage, and the blocker door assembly 69 may thereby be associated with the fixture but is not necessarily part of a cooling system.

Figure 6:
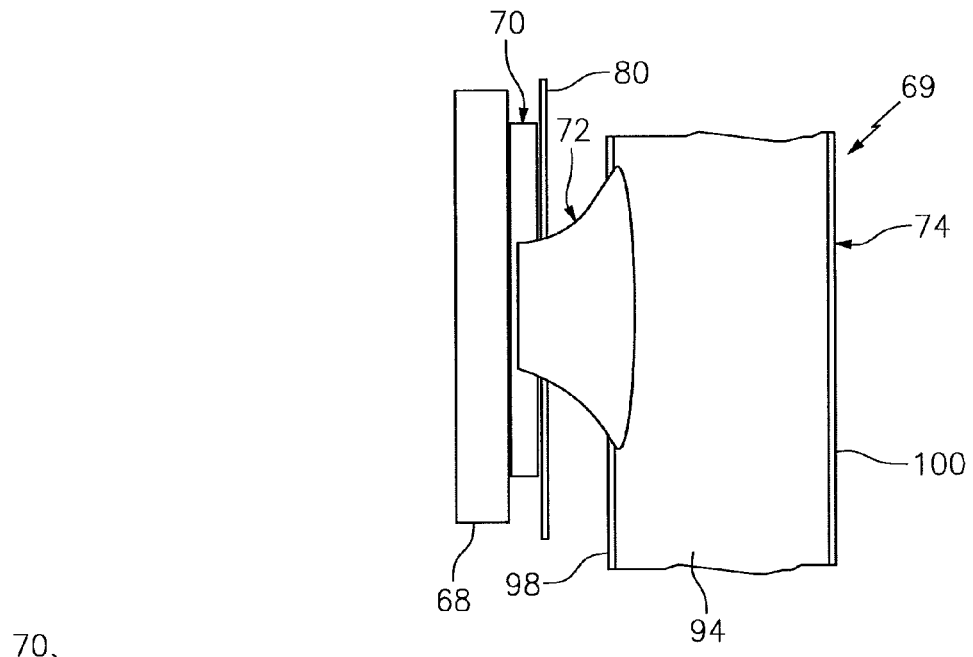
FIG. 6 is a partial top plan view of the cooling system.

Each heat exchanger 68 may generally be supported by and in the inner bypass duct 50. Alternatively, the heat exchanger 68 may be supported by and substantially in the outer bypass duct 42, or, a combination of both ducts. More specifically, each heat exchanger may be mounted to a circumferentially extending, annular, wall 80 (see FIG. 6) generally carried by the inner and outer ducts 50, 42, and which generally segregates the inner airstream 52 from the outer airstream 44. The passage 76 of each heat exchanger 68 has an outlet 82 that communicates axially through the annular wall 80 and is in direct fluid communication with the outer bypass airstream 44.

Figure 7:
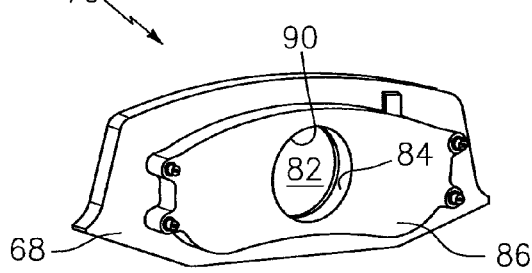
FIG. 7 is a perspective view of a blocker door of the cooling system in an open position.
Figure 8:
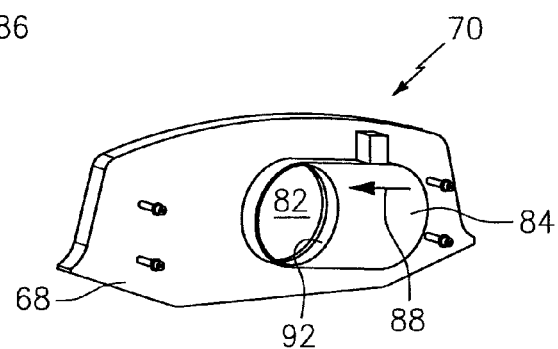
FIG. 8 is a perspective view of the blocker door with a housing removed to show internal detail.
Figure 9:
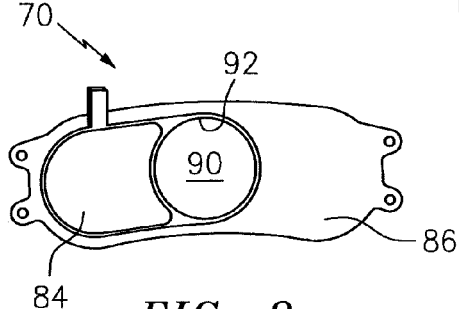
FIG. 9 is a perspective view of the blocker door viewing in an opposite axial direction from FIG. 7.

Referring to FIGS. 4 and 7 through 9, each one of the plurality of blocker doors 70 is located adjacent to and downstream of a respective one of the plurality of heat exchangers 68 and are constructed to move between open and closed positions, or points there-between, to control flow through the outlet 82 (see FIGS. 7 through 9 illustrating the fully open position). Each blocker door 70 may have a translating partition 84 and a housing 86. The translating partition 84 is constructed to move in a circumferential direction (see arrow 88 in FIG. 8) to move across the opening 82 thereby varying the degrees of passage 76 obstruction, controlling the flow of portion 60 of airstream 52, and thereby controlling the heat transfer capability of the heat exchangers 68. The housing 86 may be detachably engaged to the heat exchanger 86 or adjacent wall 80, and slidably supports the partition 84. The housing 86 may have a hole 90 that is aligned with the outlet 82. The partition 84 may have a hole 92 that aligns with the outlet 82 and the hole 90 when in the open position.

Figure 5:
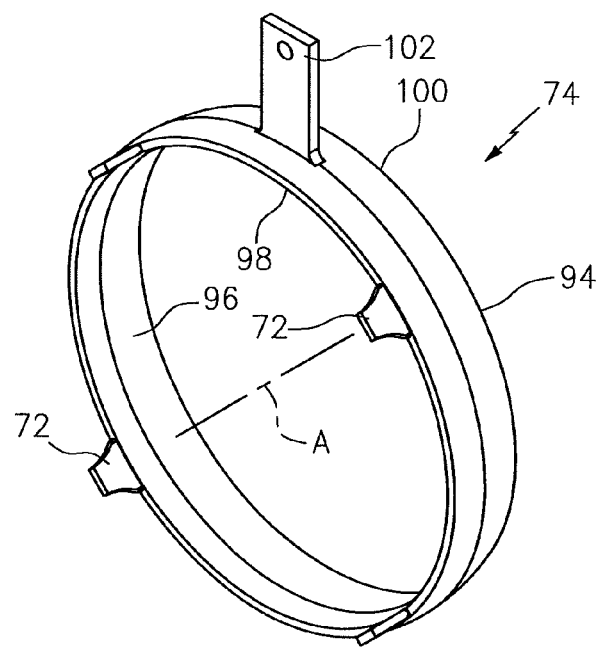
FIG. 5 is a perspective view of a sync-ring of the cooling system.

Referring to FIGS. 4 and 5, the sync-ring 74 is axially spaced downstream from the plurality of blocker doors 70 and is located in the outer duct 42 to facilitate simultaneous and circumferential movement of the blocker doors 70. The sync-ring 74 has an aero-dynamic shape to minimize flow resistance in the outer airstream 44. As best shown in FIG. 4, the sync-ring 74 has an aerodynamic cross-section taken along an imaginary plane that spans radially with the engine axis A lying therein. More specifically, the sync-ring may include an arcuate outer side 94 that substantially faces radially outward, and an opposite, arcuate, inner side 96 that substantially faces radially inward. Each side 94, 96 span axially and join at leading and trailing edges 98, 100 of the sync-ring 74. The sides 94, 96 may generally be convex in profile, the leading edge 98 may generally be bull-nosed, and the trailing edge 100 may generally be pointed. The sync-ring may be manufactured as one circumferentially continuous ring, or may be manufactured in segments, that when assembled is circumferentially continuous, such that the leading edge 98 and the trailing edge 100 are circumferentially continuous.

Each one of the plurality of stanchions 72 extend axially between and may be rigidly engaged to a respective translating partition 84 of the blocker door 70 and the leading edge 98 of the sync-ring 74. The sync-ring 74 may further have a tab 102 that projects radially outward from the outer side 100 and through the outer duct 42 for engagement to a powered actuator (not shown). During operation of the cooling system 58, the powered actuator facilitates movement of the tab 102 in a circumferential direction that rotates the entire sync-ring 74. Rotation of the sync-ring 74, and via the stanchions 72, move the partitions 84 of the blocker doors 70 in the same circumferential direction to open and/or close the passage outlet 82.

It is further understood and contemplated that spacing of the sync-ring 74 axially downstream from the blocker doors 70 enables greater control and manipulation of the flow pattern and/or direction of airstream 44. As one, non-limiting, example, the leading edge 98 may be radially offset from the trailing edge 100 of the sync-ring to improve mixing of the discharged portion 60 with the airstream 44.

As another example, the outer side 94 may have a convex profile and the inner side 96 may have a concave profile.

The aerodynamic design of the sync-ring 74 increases engine performance by reducing airstream 44 pressure losses. As one example, sync-rings located within airstreams are known to create pressure losses of about ten percent. Use of the aero-dynamic sync-ring of the present disclosure will reduce pressure losses by many orders of magnitude. Moreover, the aero-dynamic shape of the present sync-ring reduces axial pressure loads on the structure thereby optimizing sync-ring actuation. Less axial pressure loads enable the design of smaller and/or light sync-rings and/or sync-rings made of lighter and or less expensive materials.

While the invention is described with reference to exemplary embodiment(s), it will be understood by those skilled in the art that various changes may be made and equivalents may be substituted without departing from the spirit and scope of the invention. Therefore, different modifications may be made to adapt the teachings of the invention to particular situations or materials, without departing from the essential scope. The invention is thus not limited to the particular examples and/or disclosed structures, but includes all embodiments falling within the scope of the appended claims, which scope is accorded the broadest interpretation so as to encompass all such modifications, equivalent structures and methods. Moreover, although particular step sequences may be shown, described, and claimed, it is understood that steps may be performed in any order, separated or combined unless otherwise indicated and will still benefit from the present disclosure. It is further understood that when the language "at least a portion," "a portion," and/or "at least in-part" is used in the claims, the item may include a portion and/or the entire item unless specifically stated to the contrary.

What is claimed is:

1. A blocker door assembly for a gas turbine engine comprising:
    a plurality of blocker doors circumferentially spaced about an engine axis, wherein each blocker door is constructed and arranged to move in a circumferential direction to control air flow through a respective one of a plurality of passages in an adjacent fixture;
    an aerodynamically shaped sync-ring concentrically located about the engine axis, disposed in an annular first duct in direct communication with the plurality of passages, and engaged to each one of the plurality of blocker doors for simultaneous operation; and
    a plurality of stanchions in the first annular duct, wherein each stanchion of the plurality of stanchions extends axially between and is engaged to a respective one of the plurality of blocker doors and the sync-ring.

2. The blocker door assembly set forth in claim 1, wherein the sync-ring has an aerodynamic cross-sectional profile for minimizing air flow resistance in the first duct.

3. The blocker door assembly set forth in claim 2, wherein the cross sectional profile has a first convex side facing substantially radially outward and a second convex side facing substantially radially inward.

4. The blocker door assembly set forth in claim 3, wherein the first and second convex sides each span axially and form together at circumferentially continuous leading and trailing edges.

5. The blocker door assembly set forth in claim 4, wherein the leading edge is bull-nosed and the trailing edge is pointed.

6. The blocker door assembly set forth in claim 5 further comprising:
    a plurality of stanchions in the first duct, wherein each stanchion of the plurality of stanchions extends axially between and is engaged to a respective one of the plurality of blocker doors and the leading edge.

7. A blocker door assembly for a gas turbine engine comprising:
    a plurality of blocker doors circumferentially spaced about an engine axis, wherein each blocker door is constructed and arranged to move in a circumferential direction to control air flow through a respective one of a plurality of passages in an adjacent fixture; and
    an aerodynamically shaped sync-ring concentrically located about the engine axis, disposed in an annular first duct in direct communication with the plurality of passages, and engaged to each one of the plurality of blocker doors for simultaneous operation;
    wherein the aerodynamically shaped sync-ring is located downstream from the plurality of blocker doors.

8. A blocker door assembly for a gas turbine engine comprising:
    a plurality of blocker doors circumferentially spaced about an engine axis, wherein each blocker door is constructed and arranged to move in a circumferential direction to control air flow through a respective one of a plurality of passages in an adjacent fixture; and
    an aerodynamically shaped sync-ring concentrically located about the engine axis, disposed in an annular first duct in direct communication with the plurality of passages, and engaged to each one of the plurality of blocker doors for simultaneous operation;
    wherein the sync-ring has an aerodynamic cross-sectional profile for minimizing air flow resistance in the first duct; and
    wherein the sync-ring spans substantially axially between circumferentially continuous leading and trailing edges, and wherein the leading and trailing edges are radially displaced from one-another for mixing of air flow.

9. A blocker door assembly for a gas turbine engine comprising:
    a plurality of blocker doors circumferentially spaced about an engine axis, wherein each blocker door is constructed and arranged to move in a circumferential direction to control air flow through a respective one of a plurality of passages in an adjacent fixture; and
    an aerodynamically shaped sync-ring concentrically located about the engine axis, disposed in an annular first duct in direct communication with the plurality of passages, and engaged to each one of the plurality of blocker doors for simultaneous operation;
    wherein the fixture is a heat exchanger operative to flow a cooling airstream received from an annular second duct and expelled into the first duct.

* * * * *